United States Patent [19]

Fenk et al.

[11] Patent Number: 5,566,360
[45] Date of Patent: Oct. 15, 1996

[54] TRANSMITTER/RECEIVER CONFIGURATION FOR HIGHER FREQUENCIES

[75] Inventors: Josef Fenk, Eching; Helmut Herrmann, München; Peter Sehrig, Poecking; Werner Veit, München, all of Germany

[73] Assignee: Siemens Aktiengesellschaft, Munich, Germany

[21] Appl. No.: 226,967

[22] Filed: Apr. 13, 1994

[30] Foreign Application Priority Data

Apr. 13, 1993 [DE] Germany .......................... 43 12 020.2

[51] Int. Cl.$^6$ ...................................... H04B 1/40
[52] U.S. Cl. .................... 455/84; 455/78; 455/85
[58] Field of Search ........................ 455/73, 76, 78, 455/84, 85, 86, 87, 88

[56] References Cited

U.S. PATENT DOCUMENTS

| | | | |
|---|---|---|---|
| 4,027,242 | 5/1977 | Yamanaka | 325/17 |
| 4,246,539 | 1/1981 | Haruki et al. | 455/76 |
| 4,475,245 | 10/1984 | Iimura et al. | 455/73 |
| 5,239,689 | 8/1993 | Fukuda | 455/86 |
| 5,319,799 | 6/1994 | Morita | 455/78 |
| 5,390,363 | 2/1995 | Mirtich et al. | 455/87 |

FOREIGN PATENT DOCUMENTS

| | | |
|---|---|---|
| 0206247 | 12/1986 | European Pat. Off. . |
| 0398688 | 11/1990 | European Pat. Off. . |
| 0529767 | 3/1993 | European Pat. Off. . |
| 0541305 | 5/1993 | European Pat. Off. . |
| 4143197 | 11/1992 | Germany . |
| 1584623 | 2/1981 | United Kingdom . |
| 2256103 | 11/1992 | United Kingdom . |

OTHER PUBLICATIONS

Patent Abstract of Japan Publication No. JP 56089136, (Takeo et al.), Jul. 20, 1981.

*Primary Examiner*—Reinhard J. Eisenzopf
*Assistant Examiner*—Gertrude Arthur
*Attorney, Agent, or Firm*—Herbert L. Lerner; Laurence A. Greenberg

[57] ABSTRACT

A integratable transmitter/receiver configuration for higher frequencies includes a reception path mixer multiplying a reception signal and a carrier frequency signal with one another. A controlled first intermediate frequency oscillator can be turned off by a switch control signal and has a frequency range being reversible by a first range control signal. A demodulator is connected downstream of the reception path mixer and receives the output signal of the first intermediate frequency oscillator both directly and phase-displaced by 90°. A phase detector device is connected downstream of and controls the first intermediate frequency oscillator, and has a frequency range being reversible by a second range control signal. A controlled second intermediate frequency oscillator is connected parallel to the first intermediate frequency oscillator and can be turned on by the switch control signal. A transmission path mixer has one input being connected to the outputs of the first and second intermediate frequency oscillators and has another input receiving the carrier frequency signal. A modulator is connected downstream of the transmission path mixer, receives an input signal, and supplies a transmission signal.

6 Claims, 2 Drawing Sheets

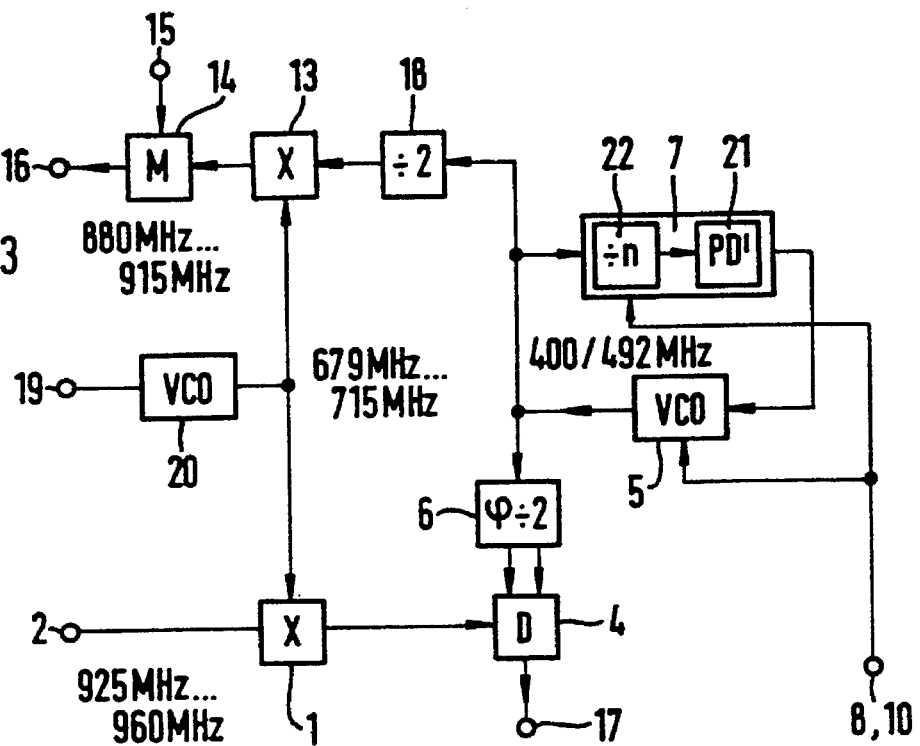
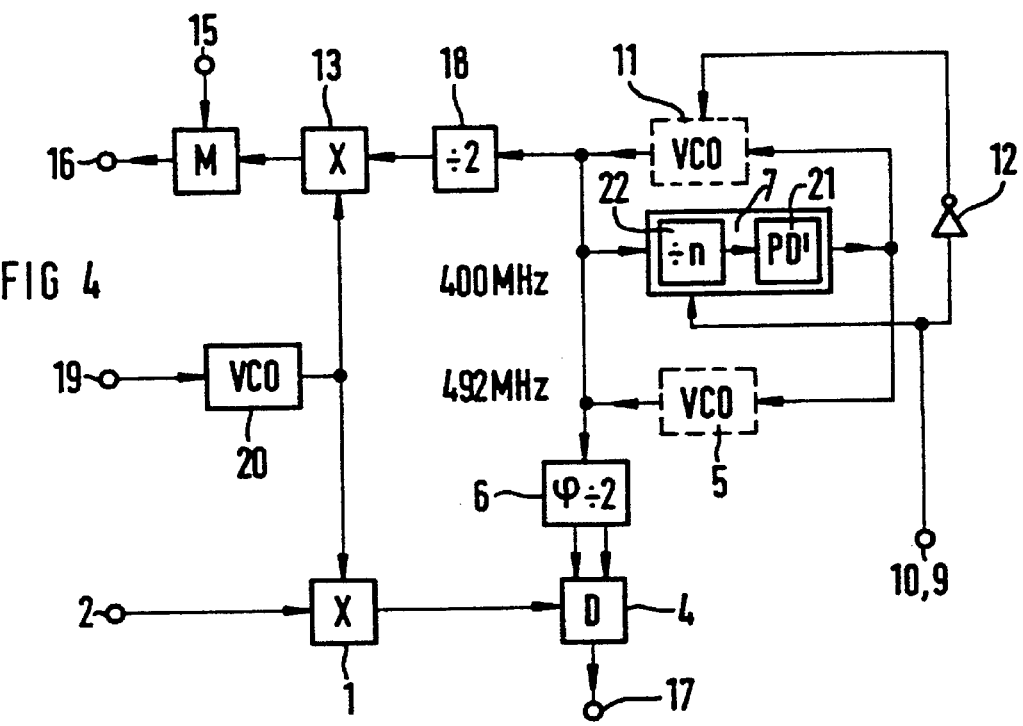

5,566,360

TRANSMITTER/RECEIVER CONFIGURATION FOR HIGHER FREQUENCIES

BACKGROUND OF THE INVENTION

Field of the Invention

The invention relates to a transmitter/receiver configuration for higher frequencies, in particular for applications in the mobile radio field.

In circuit configurations in high-frequency technology and in particular in mobile radio technology, the highest possible degree of integration is sought in order to keep down costs and dimensions of the end product. That usually dictates a finished circuit structure which leaves only a few options for modification to the user of the integrated circuit. Yet it is precisely in high-frequency technology that great flexibility is advantageous since circuit adaptations with respect to noise, sensitivity, crosstalk, etc., usually involve relatively major modifications up to the point of changing the circuit structure itself. That in turn often means additional expense for circuitry or a change to other circuits, which entails even further costs. Moreover, that is also disadvantageous for the circuit manufacturer, because the manufacturer has to offer different circuits for different applications.

SUMMARY OF THE INVENTION

It is accordingly an object of the invention to provide an integratable transmitter/receiver configuration for higher frequencies, which overcomes the hereinafore-mentioned disadvantages of the heretofore-known devices of this general type and which is suitable for various circuit layouts.

With the foregoing and other objects in view there is provided, in accordance with the invention, an integratable transmitter/receiver configuration for higher frequencies, comprising a reception path mixer multiplying a reception signal and a carrier frequency signal with one another; a controlled first intermediate frequency oscillator being able to be turned off by a switch control signal, having a frequency range being reversible by a first range control signal, and having an output supplying an output signal; a demodulator being connected downstream of the reception path mixer, receiving the output signal of the first intermediate frequency oscillator both directly and phase-displaced by 90°, and supplying an output signal; a phase detector device being connected downstream of and controlling the first intermediate frequency oscillator, the phase detector device having a frequency range being reversible by a second range control signal; a controlled second intermediate frequency oscillator being connected parallel to the first intermediate frequency oscillator, being able to be turned on by the switch control signal, and having a output; a transmission path mixer having one input being connected to the outputs of the first and second intermediate frequency oscillators and having another input receiving the carrier frequency signal; and a modulator being connected downstream of the transmission path mixer, receiving an input signal, and supplying a transmission signal.

The configuration according to the invention offers the user numerous options for adaptation, with the following three operating modes or circuit structures being preferably chosen:

In accordance with another feature of the invention, in a first operating mode, the first intermediate frequency oscillator is turned on and the second intermediate frequency oscillator is turned off, and that the first intermediate frequency oscillator and the phase detector device are switched to the same frequency range.

In accordance with a further feature of the invention, in a second operating mode, again the first intermediate frequency oscillator is switched on and the second intermediate frequency oscillator is switched off. However, the first intermediate frequency oscillator and the phase detector device are switched over between different frequency ranges.

In accordance with an added feature of the invention, in a third operating mode, in the transmission mode, the first intermediate frequency oscillator is turned off and the second intermediate frequency oscillator is turned on, while in the reception mode the second intermediate frequency oscillator is turned off and the first intermediate frequency oscillator is turned on; the first and second intermediate frequency oscillators have different frequency ranges, and the phase detector device is switched in the transmission mode to the frequency range of the second intermediate frequency oscillator and in the reception mode to the frequency range of the first intermediate frequency oscillator.

In accordance with an additional feature of the invention, the phase detector device includes a phase detector and a preceding frequency divider, having a divider ratio that is reversible by the second range control signal.

In accordance with a concomitant feature of the invention, the carrier frequency signal is generated by a controllable oscillator.

Other features which are considered as characteristic for the invention are set forth in the appended claims.

Although the invention is illustrated and described herein as embodied in a transmitter/receiver configuration for higher frequencies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is another similar block diagram of a circuit for a second operating mode; and FIG. 4 is a further similar block diagram of a circuit for a third operating mode.

DESCRIPTION OF THE PREFERRED EMBODIMENTS

Figure 1:
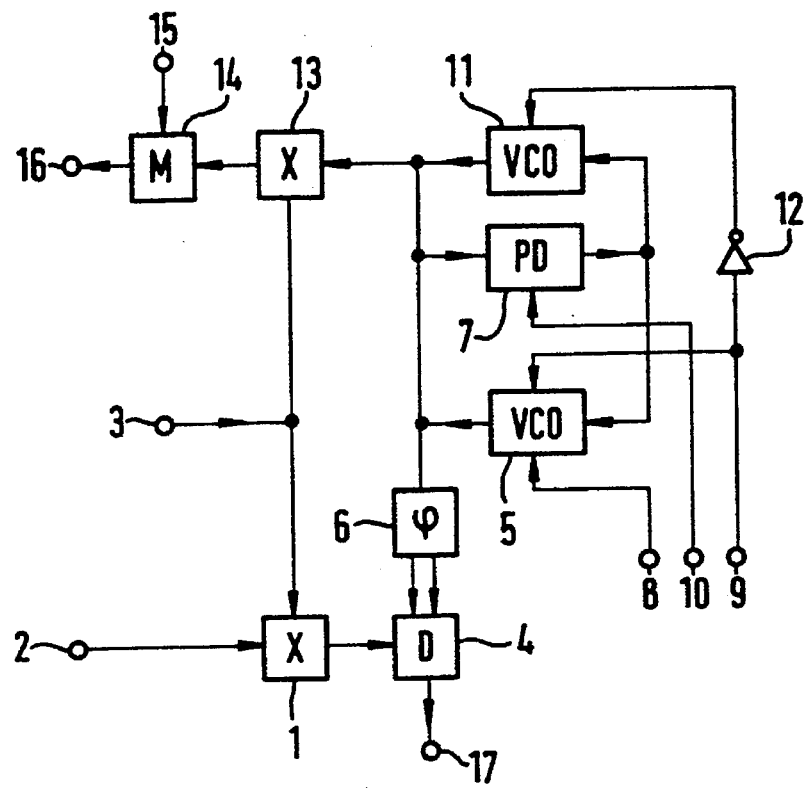
FIG. 1 is a basic block and schematic circuit diagram of a general embodiment of a configuration according to the invention.

Referring now to the figures of the drawing in detail and first, particularly, to FIG. 1 thereof, there is seen a transmitter/receiver configuration which includes a reception path mixer 1 to which a reception signal 2 and a carrier frequency signal 3 are supplied. The reception path mixer 1 forms a product of the reception signal 2 and the carrier frequency signal 3 and carries it onto a demodulator unit 4, which is moreover supplied with an output signal of a controllable oscillator 5, both directly and phase-displaced by 90°. The demodulator unit 4 outputs an output signal 17. The phase displacement in the exemplary embodiment shown is generated by means of a phase shifter 6. However, in the same way, phase-displaced signals of this kind may also be generated by the controllable oscillator 5 itself, for example.

The frequency of the oscillator 5 is controlled by a phase detector 7 within a certain frequency range. This frequency range may be changed by means of a range control signal 8. The oscillator 5 can also be turned off by means of a switch control signal 9. The phase detector device 7 has an input which is connected to the output of the oscillator 5. The frequency range of the phase detector device 7 can also be switched over by means of a range control signal 10. Connected parallel to the oscillator 5 is a controlled oscillator 11, which can be turned on by the switch control signal 9. Since only one of the two oscillators 5 and 11 is intended to be in operation at a time, an inverter 12 is connected between the corresponding inputs for the switch control signal 9. The outputs of the oscillators 5 and 11 are carried to one input of a transmission path mixer 13, which is additionally triggered by the carrier frequency signal 3. Finally, the transmission path mixer is followed by a modulator 14, to which an input signal 15 is also applied for modulation and which outputs a transmission signal 16.

The configuration shown can be integrated either entirely or in part, and it is also advantageous to split it between two separate integrated circuits. This makes it possible for the user to employ various different circuit structures, which make three preferred circuit principles (operating modes) possible. In the operating modes shown in the figures discussed below, the assumption in each case is an application in which the transmission signal is in a range between 880 and 915 MHz and the reception signal is in a range between 925 and 960 MHz. A phase shifter is also used which has output signals that are phase-shifted relative to one another and which have half the frequency of the input signal. For this reason, a frequency divider 18 with a 1:2 divider ratio precedes the transmission path mixer 13, and the frequency of the oscillator 5 or 11 is doubled. The phase detection unit 7 also includes a phase detector PD' 21 operating at a fixed frequency, which is preceded by a divider 22 with a reversible divider ratio. Finally, the carrier frequency signal 3 is generated by a controlled carrier frequency oscillator 20.

Figure 2:
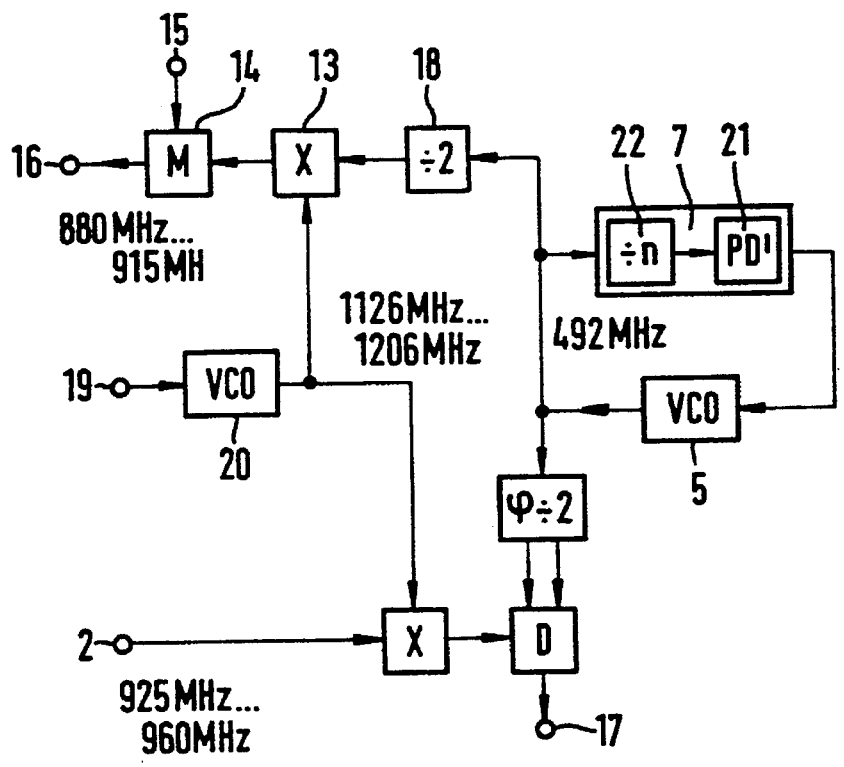
FIG. 2 is a block diagram similar to FIG. 1 of a circuit for a first operating mode.

In FIGS. 2–4 of the drawings which are described below, identical elements are identified by the same reference numerals, and units not in operation in the operating mode under discussion are not shown, while units that are connected in alternation are shown in dashed lines.

In the operating mode shown in FIG. 2, only the oscillator 5 is turned on, and the oscillator 5 and the phase detector device 7 operate in the same frequency range, for instance at a frequency of 492 MHz.

In this operating mode, although the oscillator 20 with a high variable frequency range of 1126 to 1206 MHz is needed, nevertheless only one of the two oscillators 5 and 11 is in operation, and the result is lower power consumption.

In the operating mode of FIG. 3, once again, only the oscillator 5 is turned on. The oscillator 5 and the phase detection unit 7 are switched over between two frequency ranges, for instance between the fixed frequencies of 400 MHz and 492 MHz, corresponding to the transmission and reception modes. The circuit structure is substantially equivalent to that of FIG. 2. Unlike FIG. 2, however, the oscillator 5 and the phase detection unit 7 are switched over between the given ranges.

The carrier frequency oscillator advantageously operates at a low oscillation frequency and through a low variable frequency range of 679 to 715 MHz. In this operating mode as well, only two oscillators are in operation, namely the oscillator 5 and the oscillator 20. Once again, the power consumption is low.

In the operating mode of FIG. 4, in the transmission mode, the oscillator 11 is turned on and the oscillator 5 is off. Conversely, in the reception mode, the oscillator 11 is turned off and the oscillator 5 is on. The oscillators 5 and 11 operate within different frequency ranges. The oscillator 11, for instance, operates at 400 MHz in the transmission mode and the oscillator 5 operates at 492 MHz in the reception mode. The phase detection unit 7 therefore operates in the transmission mode at the frequency of the oscillator 11, that is approximately 400 MHz, and in the reception mode at the frequency of the oscillator 5, that is approximately 492 MHz. The switchover of the phase detection unit 7 and the turn-on and turn-off of the oscillators 5 and 11 are effected with the control signals 10 and 9.

Once again, the carrier frequency oscillator 20 in this case operates at low oscillation frequency in the range between 679 and 715 MHz and has a low variable frequency range. Since the oscillators 5 and 11 are turned on in alternation, or in other words only one of the two is in operation at any given time, a lower power consumption is again attained.

The modulator 14, the transmission path mixer 13, optionally the divider 18, the controlled oscillator 11, the phase detection unit 7 and optionally the carrier frequency oscillator 20, are preferably integrated in one circuit, while the reception path mixer 1, the demodulator 4, the controlled oscillator 5 and optionally the phase shifter 6, are integrated in another circuit. The transmission and reception circuits are thus largely decoupled. Moreover, frequency-determining elements such as inductive resistors and capacitors are constructed as discrete elements. In the transmitter/receiver configuration presented herein, an extremely flexible system architecture is thus made possible. As has been shown, at least three different variant modes can be provided without requiring modification of the circuits on the chip. This is achieved by means of a single phase detection unit having a frequency that can be switched over, in combination with a controlled oscillator having a frequency that can likewise be switched over. Moreover, a further controlled oscillator is provided that can be selectively used instead of the reversible oscillator. All of the controlled oscillators are constructed in such a way that they are operated selectively, with the aid of external passive components, as oscillators or as input buffers for signals that are generated by external oscillators.

As has been shown, the configuration according to the invention offers the user the advantage of maximally flexible system architecture. The user need not stick to one structure from the outset but instead can weigh the advantages and disadvantages of the various structures on his or her own and then decide individually.

We claim:

1. A transmitter/receiver configuration for higher frequencies, comprising:

a reception path mixer multiplying a reception signal and a carrier frequency signal with one another;

a controlled first intermediate frequency oscillator having a capability of being turned on or off by a switch control signal, having a frequency range capable of being changed by a first range control signal, and having an output supplying an output signal;

a demodulator connected downstream of said reception path mixer, receiving the output signal of said first intermediate frequency oscillator both directly and phase-displaced by 90°, and supplying an output signal;

a phase detector device connected downstream of and controlling said first intermediate frequency oscillator, said phase detector device having a frequency range capable of being changed by a second range control signal;

a controlled second intermediate frequency oscillator connected parallel to said first intermediate frequency oscillator, having a capability of being turned on or off by the switch control signal, and having an output;

a transmission path mixer having one input connected to the outputs of said first and second intermediate frequency oscillators and having another input receiving the carrier frequency signal; and a modulator connected downstream of said transmission path mixer, receiving an input signal, and supplying a transmission signal.

2. The configuration according to claim 1, wherein said first intermediate frequency oscillator is turned on and said second intermediate frequency oscillator is turned off, and said first intermediate frequency oscillator and said phase detector device are switched to the same frequency range.

3. The configuration according to claim 1, wherein said first intermediate frequency oscillator is turned off, and said first intermediate frequency oscillator and said phase detector device are switched over between two frequency ranges in transmission and reception modes.

4. The configuration according to claim 1, wherein:

said first intermediate frequency oscillator is turned off and said second intermediate frequency oscillator is turned on in a transmission mode;

said second intermediate frequency oscillator is turned off and said first intermediate frequency oscillator is turned on in a reception mode;

said first and second intermediate frequency oscillators have different frequency ranges; and said phase detector device is switched to the frequency range of said second intermediate frequency oscillator in the transmission mode and to the frequency range of said first intermediate frequency oscillator in the reception mode.

5. The configuration according to claim 1, wherein said phase detector device includes a phase detector and a frequency divider connected upstream of said phase detector, having a divider ratio capable of being reversed by the second range control signal.

6. The configuration according to claim 1, including a controllable oscillator generating the carrier frequency signal.

* * * * *